J. H. DICKINSON.
MOTOR DRIVE FOR PHONOGRAPHS.
APPLICATION FILED MAR. 20, 1917.

1,405,572.

Patented Feb. 7, 1922.
2 SHEETS—SHEET 1.

UNITED STATES PATENT OFFICE.

JOSEPH HUNTER DICKINSON, OF CRANFORD, NEW JERSEY, ASSIGNOR TO THE AEOLIAN COMPANY, A CORPORATION OF CONNECTICUT.

MOTOR DRIVE FOR PHONOGRAPHS.

1,405,572.  Specification of Letters Patent.  Patented Feb. 7, 1922.

Application filed March 20, 1917. Serial No. 156,120.

*To all whom it may concern:*

Be it known that I, JOSEPH HUNTER DICKINSON, a citizen of the United States of America, and a resident of Cranford, Union County, and State of New Jersey, have invented certain new and useful Improvements in Motor Drives for Phonographs, of which the following is a specification, reference being had to the accompanying drawings, forming a part thereof.

My invention relates to improvements in motor drive for phonographs, and its object is to provide an electric motor for driving the turn table or record holder of talking machines and the like, with interposed mechanism between the motor and the record holder for compensating for any possible variation in the motor speed. More specifically its object is to provide a spring between the motor and the record holder for balancing any proportional variation in the speed of the motor in order to cause a record holder to be driven at a desired constant rate.

In order that my invention may be thoroughly understood, I will now proceed to describe the same in the following specification, and then point out the novel features thereof in appended claims.

Referring to the drawings:

Figure 2 is a side elevation of the mechanism.

Like characters of reference designate corresponding parts in all the figures.

Figure 1:
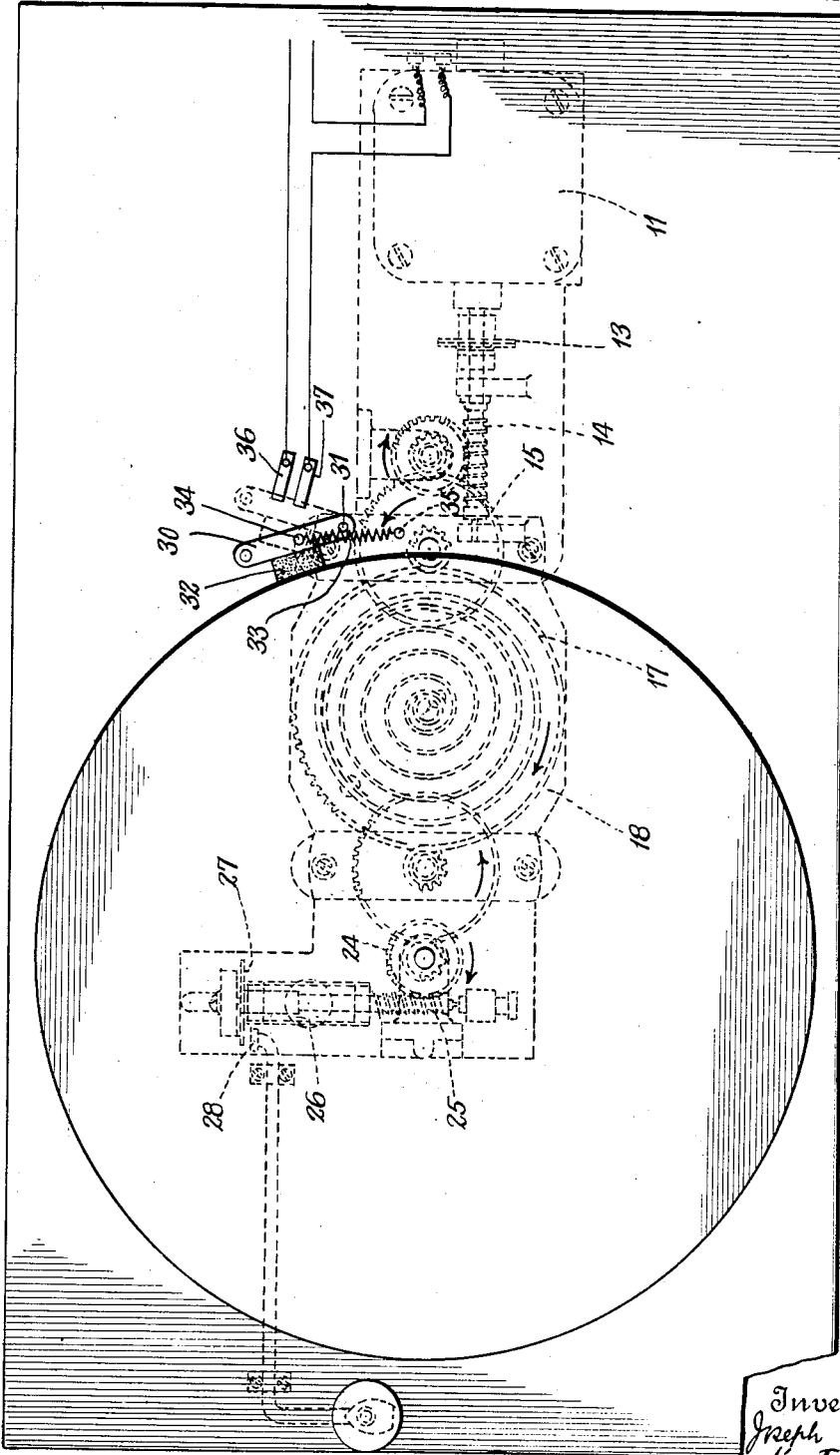
Figure 1 is a plan view of a mechanism made according to and embodying my invention.
Figure 1:

10 designates a plate upon which the various parts of the apparatus are supported. 11 is an electric motor secured to this plate. A pad 12 of felt or like material is preferably interposed between the motor base and the plate 10, for the purpose of deadening any motor vibrations. The motor shaft is connected by a flexible coupling 13 with a worm 14, which, through suitable reduction gearing 15, is arranged to turn a spring winding gear 16. This is connected to wind up a spiral spring 17 within the housing 18. The other end of the spring 17 is connected to drive a gear 20, and this gear through gearing 21 is connected to drive the shaft 22 of the record bearing turn-table 23 at an increased rate of speed. A worm gear 24 on this shaft 22 meshes with a worm 25 on which is mounted the governor 26 and its disc 27 which coacts with a manually adjustable brake shoe 28 by means of which the driven speed of the turn-table shaft 22 is limited to a desired rate and maintained at a continuous, regular speed.

30 is a lever pivoted at 31, which carries a brake shoe 32 which is arranged to engage the periphery of the turn-table 23. 33 is a spring connected with lever 30 at 34 and with plate 10 at 35. The tension of this spring pulls the brake shoe 32 against the turn-table when the parts are in the positions in which they are shown in full lines in Figure 1. Back of the lever 30 are two stationary electric contacts 36 and 37 into which the lever is pulled by the spring 33 when in the position in which it is shown in dotted lines. The lever may be moved from one to the other of these positions by hand. When in the full line position the turn-table is held from turning and the motor circuit is broken. When in the dotted line position the brake shoe 32 is removed from the turn-table to allow it to turn under the influence of the spring 17 and the motor circuit which is connected with the contacts 36—37 is closed by the lever 30 bridging these contacts, to cause the motor to drive the turn-table through the spring 17, it being understood of course that the motor circuits are suitably connected with a source of supply.

I will now describe the operation of this apparatus: a record is placed upon the turn-table and the sound box adjusted in the usual manner. When the lever 30 is moved to the right the instrument will operate. The spring 17 need not be as heavy and as powerful as those required in manually wound spring motors, as with this apparatus it is not necessary to store up any considerable amount of power.

When the lever 30 is thus moved to the right to release the turn-table, it closes the circuit to motor 11 so that the latter rotates and through the gearing described partially winds up the spring. The parts are so designed and the motor and turn-table speeds so proportioned that the motor will wind up the spring as it is unwound and will maintain the spring in a partially wound up condition. There is of course a necessity of having the turn-table speed absolutely constant to a greater degree of nicety than that of an electric motor. The speed of such a motor varies under ordinary conditions with variations in load and variations in voltage of the supply current. Such variations or fluctuations from any cause will, with my apparatus, have no effect upon the rate of rotation of the turn-table. If the motor runs too slowly there is sufficient reserve power stored up in the spring to compensate for it. If the motor runs too fast its speed will be checked by the spring itself which by becoming more fully wound up, puts an overload on the motor, which has a series characteristic that will cause its speed to be lowered under such conditions. The friction brake and governor act as a positive check to any variations in speed and operate to maintain a continuous even rotation of the turntable at the speed to which the apparatus has been adjusted.

I have described a simple and inexpensive mechanism which embodies my invention but do not intend to limit myself to any specific construction or arrangement of parts; in fact I intend no limitations other than those imposed by the appended claims.

What I claim is:

1. In a phonograph, a rotary record bearing member, a spring for driving the same, an electric motor arranged to run while the record bearing member is rotating and connected with the spring to maintain the same in a partially wound condition during the rotation of the record bearing member, a brake for the record bearing member and a governor arranged to actuate said brake to maintain the record bearing member at a continuous and regular rate of rotation.

2. In a phonograph, a rotary record bearing member, a spring for driving the same, an electric motor arranged to run while said member is rotating and adapted to maintain the spring in a partially wound condition, a control circuit for the motor and control mechanism for the record bearing member arranged to control the motor circuit.

3. In a phonograph, a rotary record bearing member, a spring for driving the same, a speed governor for limiting the rate of rotation thereof, and an electric motor having a series characteristic connected to wind said spring throughout the time it is being unwound by driving the member.

4. In a phonograph, a rotary record bearing member, a speed governor for limiting the rate of rotation thereof, an electric motor arranged to drive said member, and intermediate transmission mechanism between the motor and said member comprising resilient means for permitting variations in the speed of the motor without transmitting such variations in motor speed to said member.

5. In a phonograph, a rotary record bearing member, a friction brake and a governor arranged to actuate said brake to regulate the rate of rotation of said record bearing member, an electric motor, a spiral spring, a pair of gears connected with opposite ends thereof, reduction gearing for connecting said member with one of the gears, and reduction gearing for connecting the motor with the other of said gears.

6. In a phonograph, a rotary record bearing member, a spring for driving the same, an electric motor arranged to run while said member is rotating and adapted to maintain said spring in a partially wound condition, spaced contacts in the circuit of said motor, and a control lever arranged to engage said member to hold it against rotation or to be moved away from said member to allow it to driven by the spring into engagement with said contacts to close the motor circuit.

7. In a phonograph, a rotary record bearing member, an electric motor connected to drive said member, a spring interposed between the member and the motor through which the member is driven by the motor, adapted to compensate for variations in the rate of speed of the motor, spaced contacts in the circuit of said motor, and a control lever arranged to engage said member to hold it against rotation or to be moved away from said member to allow it to be driven by the spring into engagement with said contacts to close the motor circuit.

8. In a phonograph, a rotary record bearing member, a spring for driving the same, electric motive means arranged to operate while the record bearing member is rotating and having operative connection with the spring to maintain the same in a partially wound condition to a predetermined degree during the rotation of the record bearing member, a brake for the record bearing member, and a governor arranged to actuate said brake to maintain the record bearing member at a continuous and regular rate of rotation.

In witness whereof, I have hereunto set my hand this 19 day of March, 1917.

JOSEPH HUNTER DICKINSON.